United States Patent
Boman

(10) Patent No.: US 7,740,161 B2
(45) Date of Patent: Jun. 22, 2010

(54) ENGINE WALL STRUCTURE AND A METHOD OF PRODUCING AN ENGINE WALL STRUCTURE

(75) Inventor: Arne Boman, Trollhättan (SE)

(73) Assignee: Volvo Aero Corporation, Trollhattan (SE)

( * ) Notice: Subject to any disclaimer, the term of this patent is extended or adjusted under 35 U.S.C. 154(b) by 0 days.

(21) Appl. No.: 12/063,826

(22) PCT Filed: Sep. 6, 2005

(86) PCT No.: PCT/SE2005/001293

§ 371 (c)(1),
(2), (4) Date: Feb. 14, 2008

(87) PCT Pub. No.: WO2007/030038

PCT Pub. Date: Mar. 15, 2007

(65) Prior Publication Data

US 2008/0276596 A1    Nov. 13, 2008

(51) Int. Cl.
*B23K 31/02* (2006.01)
*B21D 53/00* (2006.01)

(52) U.S. Cl. .................. 228/101; 228/214; 228/215; 29/890.01

(58) Field of Classification Search ............... None
See application file for complete search history.

(56) References Cited

U.S. PATENT DOCUMENTS

| | | | |
|---|---|---|---|
| 2,669,835 A * | 2/1954 | Rossheim et al. .............. 60/260 |
| 3,501,916 A | 3/1970 | Butter et al. |
| 3,595,025 A * | 7/1971 | Stockel et al. ................. 60/267 |
| 3,692,637 A * | 9/1972 | Dederra et al. .............. 205/114 |
| 3,780,533 A * | 12/1973 | Huang .......................... 60/260 |
| 3,910,039 A * | 10/1975 | Fortini .......................... 60/265 |
| 4,156,306 A * | 5/1979 | Seidel et al. ................... 29/423 |
| 4,582,678 A * | 4/1986 | Niino et al. ..................... 419/8 |
| 5,075,966 A * | 12/1991 | Mantkowski ............. 29/890.01 |
| 5,154,352 A | 10/1992 | Buckreus |
| 5,249,357 A * | 10/1993 | Holmes et al. ........... 29/890.01 |
| 5,501,011 A * | 3/1996 | Pellet ....................... 29/890.01 |
| 5,899,060 A * | 5/1999 | Schmidt ....................... 60/267 |
| 6,209,199 B1 * | 4/2001 | Cornu et al. ............. 29/890.01 |
| 6,516,872 B1 * | 2/2003 | Cornu et al. ................ 165/133 |
| 2003/0175453 A1 * | 9/2003 | Steffier ....................... 428/34.5 |
| 2003/0183606 A1 * | 10/2003 | Lundgren .............. 219/121.63 |
| 2004/0222571 A1 * | 11/2004 | Steffier ....................... 264/602 |

(Continued)

FOREIGN PATENT DOCUMENTS

WO    03100243 A1    12/2003

OTHER PUBLICATIONS

International Search Report for corresponding International Application PCT/SE2005/001293.

*Primary Examiner*—Kiley Stoner
(74) *Attorney, Agent, or Firm*—WRB-IP LLP

(57) ABSTRACT

An engine wall structure includes an inner wall to which hot gas is admitted during engine operation, an outer wall, which is colder than the inner wall during engine operation, and at least two webs that connect the inner wall with the outer wall and delimit a cooling duct between the walls. The webs are mainly formed by a first material and the inner wall is mainly formed by a second material of other composition and other heat conductivity than the first material.

14 Claims, 2 Drawing Sheets

U.S. PATENT DOCUMENTS

2005/0188678 A1*  9/2005  Haggander .................. 60/266
2007/0022741 A1*  2/2007  Frobhlich .................. 60/257
2008/0216315 A1*  9/2008  Boman .................. 29/888.01

* cited by examiner

ENGINE WALL STRUCTURE AND A METHOD OF PRODUCING AN ENGINE WALL STRUCTURE

BACKGROUND AND SUMMARY

The present invention relates to an engine wall structure and to a method of producing an engine wall structure that comprises an inner wall, to which hot gas is admitted during engine operation, an outer wall, which is colder than the inner wall during engine operation, and at least two webs that connect the inner wall with the outer wall and delimit a cooling duct between said walls.

During engine operation, any cooling medium may flow through the ducts. However, in particular, the invention relates to engine wall structures and a process for manufacturing engine wall structures in which there is a plurality of such webs dividing the space between the walls into a plurality of ducts, in particular for cooling the firing chamber walls and the thrust nozzle walls of rocket engines driven with hydrogen as a fuel or a hydrocarbon, i.e. kerosene, wherein the fuel is introduced in the cold state into the wall structure, is delivered through the cooling ducts while absorbing heat via the inner wall, and is subsequently used to generate the thrust. Heat is transferred from the hot gases to the inner wall, further on to the fuel, from the fuel to the outer wall, and, finally, from the outer wall to any medium surrounding it. Heat is also transported away by the coolant media as the coolant temperature increases by the cooling. The hot gases may comprise a flame generated by combustion of gases and/or fuel.

Accordingly, the engine wall structure is preferably a thrust nozzle wall, preferably of a rocket engine.

According to prior art, the engine wall structures of regeneratively cooled combustion chambers for liquid propellant rocket engines, cooling channels or ducts are machined, for example by milling, in a sheet or core that will form the inner wall, or at least part of an inner wall. In the case of regenerative cooling, this inner wall sheet may mainly comprise copper or a copper alloy. However, other materials such as steel may also be used as the core. The resulting ducts are delimited by remaining webs, and may subsequently be filled with a filler material such as a conductive resin.

Subsequently, an outer cover, defining the outer wall, is applied to and attached to the projecting webs, for example by means of electro-deposition. The outer wall may comprise plural layers of a material such as nickel or a nickel-alloy. The outer cover may, possibly, also be attached to the inside of the inner wall sheet, thereby fully sur-rounding the core. The filler material, transformed by means of heating into a liquid state, is then drained off through an end of the respective duct.

However, prior art results in an insufficient control of the exact thickness of the remaining inner wall, due to the inherent problem of obtaining an exact milling depth in the inner wall sheet. As a result, the control of the heat transfer becomes less predictable than it would have been if the exact inner wall thickness had been known. Also the area of the cross section of the ducts depends of the milling depth. Since alterations of that area will result in correspondingly altered flow conditions in the duct, this will also affect the effective heat transfer and the possibility of predicting the latter.

Moreover, the requirements on the thermal conductivity of the inner wall and the webs may differ substantially. By regenerative cooling of an engine wall structure, by which the cooling medium has a high heat absorption capacity by the large coolant mass flow and largely comprises fuel to be used in a subsequent combustion process, the conductivity of the inner wall is much more decisive for the outcome of the cooling than is the conductivity of the webs. By so called dump cooling, by which the cooling medium has a low heat absorption capacity by a low coolant mass flow, the heat conductivity of the webs may be more decisive for the outcome of the cooling than will the conductivity of the inner wall. This insight has not been mentioned at all by prior art.

It is desirable to provide an engine wall structure and a method of producing an engine wall structure as initially defined, by which heat is effectively and predictably transferred from the inner wall to the outer wall through a cooling medium, preferably a fuel, in one or more ducts and through the material of the webs that delimit said duct or ducts and that connect the inner and outer walls.

The invention shall also present an engine wall structure the construction of which is such that it promotes the obtaining of a very precisely controlled inner wall thickness upon generation of the webs as well as a facilitated subsequent attachment of the outer wall to the webs, especially when the inner wall material is different from the outer wall material and not easily connected by any metal fusion process. The design of the engine wall structure should also be such that it takes into consideration the different heat conductivity requirements of the inner wall and the webs.

According to an aspect of the present invention, the webs are formed by application of a first material onto the inner wall, said inner wall being comprised by a second material of other composition and other heat conductivity than said first material.

Any suitable technique for applying the webs to the inner wall may be used, such as welding of solid pieces of the first material onto the inner wall. However, deposition of the first material, preferably electro-deposition, is preferred.

By building the webs by means of application thereof onto the inner wall, preferably by deposition and most preferably by means of electro-deposition, the thickness of that wall will not be affected like when the webs are produced through machining of the inner wall, while, at the same time, the height of the web can be very finely adjusted, for example by means of a final milling of the web top. By using materials of different composition and heat conductivity, the webs may be tailored for their individual, specific functions, especially regarding the conductivity. Subsequent to the formation of the webs, the outer wall is attached to the webs.

Preferably, a removable mask is placed onto said inner wall before the deposition of the webs is begun, said mask defining spaces in which the webs are deposited onto the inner wall. Thereby, a precise deposition of the web material is promoted.

According to a preferred embodiment the outer wall is connected to the webs by means of a metal fusion operation, preferably welding, and most preferably laser welding. Accordingly, the outer wall comprises a sheet or the like that is connected to the webs.

Preferably, the composition of the material of the webs is substantially equal to the composition of the material of the outer wall. Thereby, any metal fusion process for attaching the second wall to the webs is facilitated.

Preferably, the material of the inner wall has higher heat conductivity than the material used for the webs. This is typically an advantage in those cases when there is a regenerative cooling with a high coolant flow rate or when the cooling medium has a high density, such as when in liquid state, resulting in a high heat absorption, but still a relatively low temperature of the cooling medium and, accordingly, in a relatively low temperature of the webs and the outer wall. The heat conductivity of the material of the inner wall will be decisive for the amount of heat that will be transferred to the cooling medium. The webs and the outer wall may then, preferably, be made of a material of higher mechanical strength than the material of the inner wall, while their conductivity is of less importance. Preferably, regenerative cooling is applied to stage combustion cycle rocket engine nozzles or expander cycle rocket engine nozzles.

In a preferred embodiment, with rapidly flowing cooling medium or a cooling medium of high density, preferably liquid fuel, the inner wall comprises a copper or a copper-based alloy, and the webs comprise steel. Typically, this is preferred for a so-called regenerative cooling when hydrogen or kerosene to be used as fuel is also used as the cooling medium. The flow of the cooling medium should be such that a temperature well below the melting point of copper or copper alloy is obtained in the inner wall, preferably below 800 K. The use of a material with a remarkably lower heat conductivity, such as steel, for the inner wall, would result in a build up of a too high temperature in the inner wall and, as a result, a deterioration of the inner wall material.

Several materials, such as steel, used for inner walls and webs have relatively low heat conductivity at low temperatures. A low temperature of the cooling medium, for instance at the cooling duct inlet, will result in a low temperature of the engine wall webs, and a low heat conductivity thereof. Also, if the heat transferability of the cooling medium is poor, for example due to a low flow rate or due to a low cooling medium density, it would be desired to compensate this by the use of a highly heat conductive material, such as aluminum, for the webs, and possibly also for the outer wall. Therefore, according to one aspect of the invention, the material of the webs has higher heat conductivity than the material of the inner wall. This feature is preferred for so called dump cooling. Preferably, dump cooling is applied to gas generator cycle rocket engine nozzles.

If the cooling ability of the engine wall structure, including the cooling medium, is poor due to a low cooling medium flow rate or a low cooling medium density, the temperature of the inner wall might be to high for permitting the use of a highly heat-conducting material such as aluminum for the inner wall. In such cases it is preferred that the temperature resistance of the material of the inner wall is better than that of the web material. Thus, according to a preferred embodiment of the invention, the inner wall comprises steel or copper and the webs comprise aluminum or an aluminum-based alloy.

According to another aspect of the present invention, an engine wall structure comprises an inner wall, to which hot gas is admitted during engine operation, an outer wall, which is colder than the inner wall during engine operation, and at least two webs that connect the inner wall with the outer wall and delimit a cooling duct between said walls, characterised in that the webs are mainly comprised by a first material and that the inner wall is mainly comprised by a second material of other composition and other heat conductivity than said first material. Preferred embodiments of the engine wall structure of the invention include those embodiments that have been described above with regard to the inventive method, especially with regard to the specific compositions of the first and second materials.

BRIEF DESCRIPTION OF THE DRAWINGS

Preferred embodiments of the present invention will now be described by way of example, with reference to the annexed drawings, on which.

DETAILED DESCRIPTION

Figure 1:
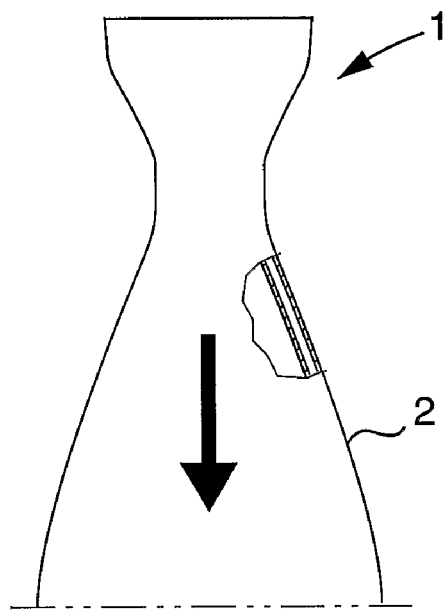
FIG. 1 shows a cross section of a nozzle provided with an engine wall structure according to the invention.
Figure 2:
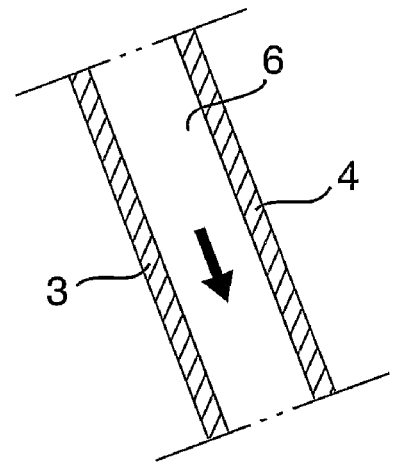
FIG. 2 is an enlargement of a segment of the engine wall structure according to FIG. 1.
Figure 3:
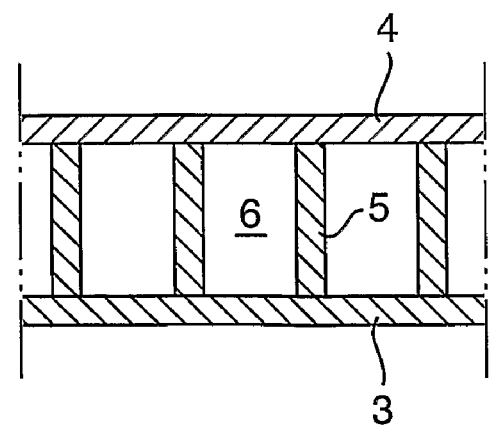
FIG. 3 is a cross section of an engine wall structure according to a first embodiment of the invention.
Figure 4:
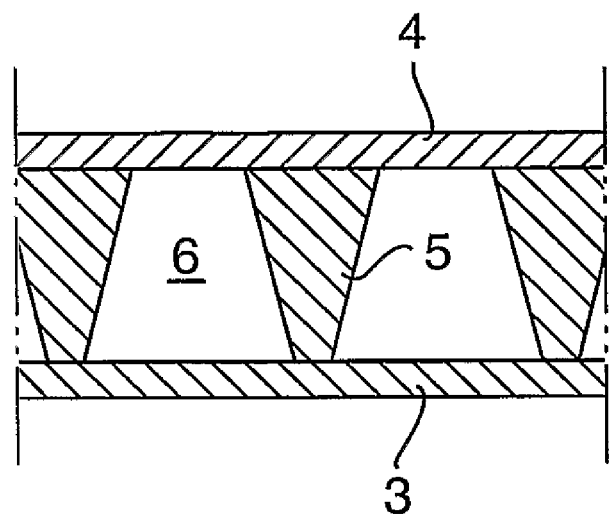
FIG. 4 is a cross section of an engine wall structure according to a second embodiment of the invention.

FIGS. 1 and 2 are schematic representations of the thrust nozzle 1 of a rocket engine. The nozzle 1 comprises and is defined by a cone-shaped or bell-shaped engine wall structure 2. The engine wall structure 2 is provided with an inner wall 3 and an outer wall 4, interconnected by a plurality of webs 5, as shown in FIGS. 3 and 4. In the space between the inner wall 3 and the outer wall 4 there are ducts 6 that are used for cooling purposes. During operation of the engine a cooling medium, preferably the fuel or part of the fuel of the engine, is permitted to flow through the ducts 6 for the purpose of cooling the engine wall structure 2. This technique applies to satellite launchers and space planes, and also in satellite thrusters, nuclear reactors and high efficiency boilers, and it can also be applied to heat shields or to the nose cones of vehicles travelling at very high speed. When a fuel, preferably in a liquid state, is used as the cooling medium, the technique is called regenerative cooling. Then, the heat absorption of the cooling medium is relatively high, since a large mass of fuel is permitted to flow through the engine wall ducts 6.

When the cooling medium comprises a gas or gas mixture that is not further used for any particular purpose, but only used for cooling purposes and then exited into the atmosphere, the technique is called dump cooling. Then, the heat absorption of the cooling medium is relatively low. Typically, dump cooling is applied when the flame of the engine generates a relatively low heat load.

The inner wall 3 and the outer wall 4 are mainly constituted by metals, preferably different metals of different heat conductivity and different mechanical strength, since the requirements on such properties will differ for the inner and outer walls 3, 4. The webs 5 are also made of metal.

The cooling ducts 6 are divided by the webs 5 and extend in the longitudinal direction of the nozzle 1, i.e. in the hot gas flow direction, as seen in particular in FIG. 2. The nozzle is cone-shaped, whereby the width of the ducts 6 increase towards the wider end of the nozzle 1, and the thickness of the webs 5 is generally constant throughout the length of the nozzle 1.

Figure 5:
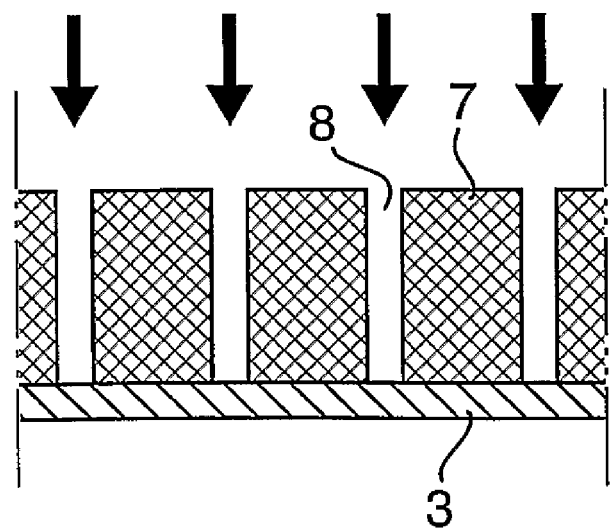
FIG. 5 is a cross section of a part of the engine wall structure during the manufacture thereof.

FIG. 3 shows a first embodiment of the invention in which the inner wall 3 is mainly constituted by a material of different composition and different heat conductivity than the material of the webs 5 directly connected thereto. The webs 5 have been attached to the inner wall 3 by means of a metal deposition method, preferably electro-deposition. The deposition or build up of the webs is schematically represented in FIG. 5, in which there is shown a mask 7 that is placed on top of the inner wall 3 before the application of the webs. The mask 7 has a height or thickness in a direction normal to the surface of the inner wall 3 that corresponds to or even exceeds that desired height of the webs 5. The mask 7 leaves open channels 8 into which the web material is brought for the purpose of being deposited on the inner wall 3. Once the deposition of the web material has been ended, the mask 7 is removed from the surface of the inner wall 3.

The mask 7 may be tailored in accordance with different pre-conditions, thereby greatly facilitating the application of different web geometries. FIG. 4 shows an embodiment in which the mask 7 has been given such a shape that the resulting webs 5 get wider towards the outer wall 4. This specific geometry might be used in order to diminish the cross section area of the ducts 6 in order to enforce a more rapid flow rate of the cooling medium and, thereby, a more effective cooling. This effect is also achieved thanks to the interface area between the webs and the outer wall 4 becoming larger than would otherwise be the case.

Once the deposition of the web material has been completed, the height of the webs 5 is finely adjusted, for example by means of milling, in order to establish a very precise web height, and, possibly, also the web width. Preferably, but not necessarily, this operation is performed after removal of the mask 7. Thereafter, the outer wall 4, constituted by a sheet of material, is positioned on top of the webs 5 and attached thereto, preferably by means of any metal fusion operation, such as laser welding.

As already told, the web material differs from the inner wall material, in particular regarding its heat conductivity, and possibly also with regard to its mechanical strength and temperature resistance.

The outer wall material and the web material should be easily interconnected by means of any metal fusion process. This is most easily achieved if their compositions are substantially equal. Accordingly, the outer wall material and the web material may have corresponding heat conductivity properties as well as mechanical properties.

For applications with a high cooling effect of the cooling medium, for example when the flow rate of the latter is high and/or when the density thereof is high, as for a liquid cooling medium, the heat conductivity of the inner wall 3 will be crucial to the total heat transfer.

Then, a high conductivity material such as copper is preferred as the inner wall material. The web material as well as the outer wall material should, of course, also have a certain conductivity, but since a large part of the heat is absorbed and carried away by the cooling medium, it might be substantially lower than that of the inner wall 3. Therefore, a material of higher mechanical strength could be used as web material and outer wall material. In a preferred embodiment steel is preferred as web and outer wall material.

For applications with a low cooling effect of the cooling medium, for example when the flow rate of the latter is low or when the density thereof is low, as for a gaseous cooling medium, the heat conductivity of the webs becomes increasingly important in order to let a larger part of the heat be transferred from the inner wall 3 to the outer wall 4 through the webs. It is then preferred that the heat conductivity of the web material is higher than that of the inner wall material. According to a preferred embodiment, the inner wall material mainly comprises steel, while the web material mainly comprises aluminum or an aluminum alloy. This is a preferred embodiment in cases when the cooling medium in the ducts 6 has a relatively low temperature, thereby permitting steel to be used as the inner wall material, and when the cooling medium is in gaseous state with inherently poor heat absorption capacity.

It should be realised that the above description of the invention only has been made by way of example and that, of course, a person skilled in the art will recognise a plurality of alternative embodiments, all however within the scope of the invention as defined in the annexed patent claims, supported by the description and the drawings.

The invention claimed is:

1. A method of producing an engine wall structure that comprises an inner wall, to which hot gas is admitted during engine operation, an outer wall, which is colder than the inner wall during engine operation, and at least two webs that connect the inner wall with the outer wall and delimit a cooling duct between the walls, comprising forming the webs by masking the inner wall and depositing a first material onto unmasked portions of the inner wall, the inner wall mainly comprising a second material of other composition and other heat conductivity than the first material.

2. A method according to claim 1, wherein, subsequent to the formation of the webs, the outer wall is attached to the webs.

3. A method according to claim 1, wherein the outer wall is connected to the webs by means of a metal fusion operation.

4. A method according to claim 3, wherein the metal fusion operation is a welding operation.

5. A method according claim 1, wherein the composition of the material of the webs is substantially equal to the composition of the material of the outer wall.

6. A method according to claim 1, wherein the material of the inner wall has higher heat conductivity than the material used for the webs.

7. A method of producing an engine wall structure that comprises an inner wall, to which hot gas is admitted during engine operation, an outer wall, which is colder than the inner wall during engine operation, and at least two webs that connect the inner wall with the outer wall and delimit a cooling duct between the walls, comprising forming the webs by deposition of a first material onto the inner wall, the inner wall mainly comprising a second material of other composition and other heat conductivity than the first material, wherein the inner wall comprises a copper or a copper-based alloy, and the webs comprise steel.

8. A method according to claim 1, wherein the material of the inner wall has a higher temperature resistance than the material of the webs.

9. A method according to claim 1, wherein the material of the webs has higher heat conductivity than the material of the inner wall.

10. A method of producing an engine wall structure that comprises an inner wall, to which hot gas is admitted during engine operation, an outer wall, which is colder than the inner wall during engine operation, and at least two webs that connect the inner wall with the outer wall and delimit a cooling duct between the walls, comprising forming the webs by deposition of a first material onto the inner wall, the inner wall mainly comprising a second material of other composition and other heat conductivity than the first material, wherein the material of the webs has higher heat conductivity than the material of the inner wall, wherein the inner wall comprises steel and the webs comprise aluminum or an aluminum-based alloy.

11. A method according to claim 1, wherein the material of the outer wall and the material of the webs have corresponding heat conductivity properties.

12. A method according to claim 1, wherein the material of the outer wall and the material of the webs have corresponding properties as to their mechanical strength.

13. A method according to claim 1, wherein a height of the webs is adjusted by a machining operation before the outer wall is attached thereto.

14. A method according to claim 1, wherein the metal deposition is performed by electro-deposition.

* * * * *